United States Patent
Kang et al.

(10) Patent No.: US 10,267,273 B2
(45) Date of Patent: Apr. 23, 2019

(54) VARIABLE INTAKE SYSTEM

(71) Applicant: HYUNDAI MOTOR COMPANY, Seoul (KR)

(72) Inventors: Sang Kyu Kang, Ansan-si (KR); Gue Hyun Jung, Gunpso-si (KR); Teok Hyeong Cho, Seoul (KR); Woo Tae Kim, Anyang-si (KR); Youn Soo Im, Seoul (KR); Kwang Min Won, Gunpo-si (KR); Seong Hyuk Kang, Hwaseong-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 644 days.

(21) Appl. No.: 14/957,554

(22) Filed: Dec. 2, 2015

(65) Prior Publication Data

US 2016/0377037 A1 Dec. 29, 2016

(30) Foreign Application Priority Data

Jun. 24, 2015 (KR) ........................ 10-2015-0089627

(51) Int. Cl.
*F02M 35/12* (2006.01)
*F02M 35/10* (2006.01)
(Continued)

(52) U.S. Cl.
CPC ....... *F02M 35/1222* (2013.01); *F02B 27/008* (2013.01); *F02B 27/0242* (2013.01); *F02B 27/0252* (2013.01); *F02B 27/0273* (2013.01); *F02B 27/0278* (2013.01); *F02M 35/10045* (2013.01); *F02M 35/10065* (2013.01);
(Continued)

(58) Field of Classification Search
CPC ............. F02M 35/1222; F02M 35/116; F02M 35/1261; F02M 35/1266; F02M 35/10255; F02M 35/10144; F02M 35/10045; F02M 35/10065; F02B 27/008; F02B 27/0278; F02B 27/0273; F02B 27/0252; F02B 27/0242
See application file for complete search history.

(56) References Cited

U.S. PATENT DOCUMENTS 5,630,386 A * 5/1997 Uchida ................... F02B 27/00
  123/184.34
5,960,759 A * 10/1999 Ohsuga ................... F02B 27/02
  123/184.31

(Continued)

FOREIGN PATENT DOCUMENTS

CN   103629022 A   3/2014
JP   H04-101016 A   4/1992
(Continued)

OTHER PUBLICATIONS

Office Action issued in Chinese Patent Application No. 201510896935.7 dated Jan. 23, 2019, with English translation.

*Primary Examiner* — Grant Moubry
(74) *Attorney, Agent, or Firm* — Morgan Lewis & Bockius LLP (57) ABSTRACT

A variable intake system includes a pair of surge tanks connected in a communicating manner to a main intake pipe through a low speed communication pipe and a high speed communication pipe, a middle speed communication pipe for connecting the pair of surge tanks, and a noise reducing member integrally provided at the middle speed communication pipe to reduce noise.

10 Claims, 5 Drawing Sheets

(51) Int. Cl.
   *F02B 27/00* (2006.01)
   *F02M 35/116* (2006.01)
   *F02B 27/02* (2006.01)

(52) U.S. Cl.
   CPC ............... *F02M 35/10144* (2013.01); *F02M 35/10255* (2013.01); *F02M 35/116* (2013.01); *F02M 35/1261* (2013.01); *F02M 35/1266* (2013.01); *Y02T 10/146* (2013.01)

(56) References Cited

U.S. PATENT DOCUMENTS

| | | | | |
|---|---|---|---|---|
| 5,979,389 | A * | 11/1999 | Espe | F02B 27/02 |
| | | | | 123/184.55 |
| 7,464,682 | B2 * | 12/2008 | Park | F02B 27/0284 |
| | | | | 123/184.55 |
| 9,051,908 | B2 * | 6/2015 | Sato | F02M 35/1255 |
| 2001/0027767 | A1 | 10/2001 | Itou | |
| 2002/0053331 | A1 * | 5/2002 | Ohsuga | F02B 27/02 |
| | | | | 123/184.31 |
| 2003/0015161 | A1 * | 1/2003 | Ozeki | F02B 27/0263 |
| | | | | 123/184.55 |

FOREIGN PATENT DOCUMENTS

| | | | |
|---|---|---|---|
| JP | H11-294171 | A | 10/1999 |
| JP | 2001-280206 | A | 10/2001 |
| KR | 10-2003-0060672 | A | 7/2003 |
| KR | 10-0398246 | B1 | 9/2003 |
| KR | 10-2005-0068648 | A | 7/2005 |
| KR | 10-1071770 | B1 | 10/2011 |

* cited by examiner

VARIABLE INTAKE SYSTEM

CROSS-REFERENCE TO RELATED APPLICATION

This application claims the benefit of priority to Korean Patent Application No. 10-2015-0089627, filed on Jun. 24, 2015 with the Korean Intellectual Property Office, the disclosure of which is incorporated herein in its entirety by reference.

TECHNICAL FIELD

The present disclosure relates to a variable intake system, and more particularly, to a variable intake system which is not restricted in an installation space, does not incur additional costs due to an installation of a resonator, and effectively reduces noise.

BACKGROUND

A variable intake system is a type of intake manifold technique of an internal combustion engine of a vehicle, which is able to enhance fuel efficiency by varying a length of an intake tract to optimize torque and power according to a speed range of an engine.

Recently, a variable intake system using a resonance effect has been used in a tuning method for enhancing a six-cylinder engine. However, since a range of revolutions per minute (RPM) of an engine is too narrow to implement a resonance effect, a multi-stage variable structure is widely used to increase the range of RPM.

In order to reduce noise in an intake system of an engine, a resonator, or a noise reducing device, is installed in the middle of an air duct. Here, a Helmholtz resonator or a tubular quarter wave resonator is used as a resonator.

However, installation of the Helmholtz resonator or the tubular quarter wave resonator causes a restriction in an installation space, making it difficult to install the resonator and increasing costs.

SUMMARY

The present disclosure has been made to solve the above-mentioned problems occurring in the prior art while advantages achieved by the prior art are maintained intact.

An aspect of the present disclosure provides a variable intake system in which a noise reduction structure for reducing noise is integrally provided in an intake manifold, eliminating the necessity to install a separate resonator such as a Helmholtz resonator or a quarter wave resonator in the middle of an air intake pipe, thus being free from restrictions in an installation space and not incurring additional cost due to an installation of a resonator.

According to an exemplary embodiment of the present disclosure, a variable intake system includes: a pair of surge tanks connected in a communicating manner to a main intake pipe through a low speed communication pipe and a high speed communication pipe; a middle speed communication pipe configured to connect the pair of surge tanks; and a noise reducing member integrally provided at the middle speed communication pipe to reduce noise.

The noise reducing member may be configured to allow one end of the middle speed communication pipe to directly communicate with the main intake pipe, and when an engine is operated at a low speed, the noise reducing member may enable one end of the middle speed communication pipe to communicate with the main intake pipe and may close the other end of the middle speed communication pipe.

The noise reducing member may include an extending pipe configured to extend from at least one end portion of the middle speed communication pipe and connected to the main intake pipe and a selective communication member configured to operate to enable the middle speed communication pipe to selectively communicate with any one of the extending pipe and the main intake pipe.

The selective communication member may be configured as a middle speed valve installed at a portion where the extending pipe, the middle speed communication pipe, and the pair of surge tanks are connected to each other, and the extending pipe may selectively communicate with any one of the middle speed communication pipe and the pair of surge tanks according to a switching operation of the middle speed valve.

A first middle speed valve may be installed at one end of the middle speed communication pipe, a second middle speed valve may be installed at the other end of the middle speed communication pipe, the middle speed communication pipe may selectively communicate with any one of the extending pipe and the pair of surge tanks according to a switching operation of the first middle speed valve, and the other end of the middle speed communication pipe may be opened and closed according to an opening and closing operation of the second middle speed valve.

When the engine is operated at a low speed, the other end of the middle speed communication pipe may be closed according to a closing operation of the second middle speed valve, and the middle speed communication pipe may communicate with the extending pipe according to a first switching operation of the first middle speed valve.

When the engine is operated at a middle or high speed, the other end of the middle speed communication pipe may be opened according to an opening operation of the second middle speed valve, and the middle speed communication pipe may communicate with the pair of surge tanks according to a second switching operation of the first middle speed valve.

According to another exemplary embodiment of the present disclosure, a variable intake system includes: a main intake pipe configured to intake air; first and second surge tanks connected to the main intake pipe in a communicating manner; a high speed communication pipe configured to connect the first and second surge tanks and the main intake pipe and having a high speed valve installed to be opened and closed; a low speed communication pipe connecting the first and second surge tanks and the main intake pipe and formed to be longer than the high speed communication pipe; a middle speed communication pipe configured to have a first end portion connected to the first surge tank and a second end portion connected to the second surge tank and having at least one middle speed valve installed to be opened and closed; and an extending pipe configured to extend from the first end portion of the middle speed communication pipe and connected to the main intake pipe, wherein the first surge tank and one end of the extending pipe may be connected in a communicating manner to the first end portion of the middle speed communication pipe, a first middle speed valve may be installed at the first end portion of the middle speed communication pipe, and the first end portion of the middle speed communication pipe may selectively communicate with the extending pipe or the first surge tank according to a switching operation of the first middle speed valve.

The second surge tank may be connected in a communicating manner to the second end portion of the middle speed communication pipe, a second middle speed valve may be installed at the second end portion of the middle speed communication pipe, and the second end portion of the middle speed communication pipe may be opened and closed according to an opening or closing operation of the second middle speed valve.

When the engine is operated at a low speed, the second end portion of the middle speed communication pipe may be closed according to a closing operation of the second middle speed valve so as to be blocked with respect to the second surge tank and the middle speed communication pipe may communicate with the extending pipe according to a first switching operation of the first middle speed valve.

When the engine is operated at a middle or high speed, the second end portion of the middle speed communication pipe may be opened according to an opening operation of the second middle speed valve so as to communicate with the second surge tank, and the first end portion of the middle speed communication pipe may communicate with the first surge tank according to a second switching operation of the first middle speed valve.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Hereinafter, an exemplary embodiment of the present disclosure will be described in detail with reference to the accompanying drawings. For reference, dimensions of elements or thicknesses of lines illustrated in the drawings referred to describe the present disclosure may be exaggerated for the convenience of understanding. Also, the terms used henceforth have been defined in consideration of the functions of the present disclosure, and may be altered according to the intent of a user or operator, or conventional practice. Therefore, the terms should be defined on the basis of the entire content of this specification.

Figure 1A:
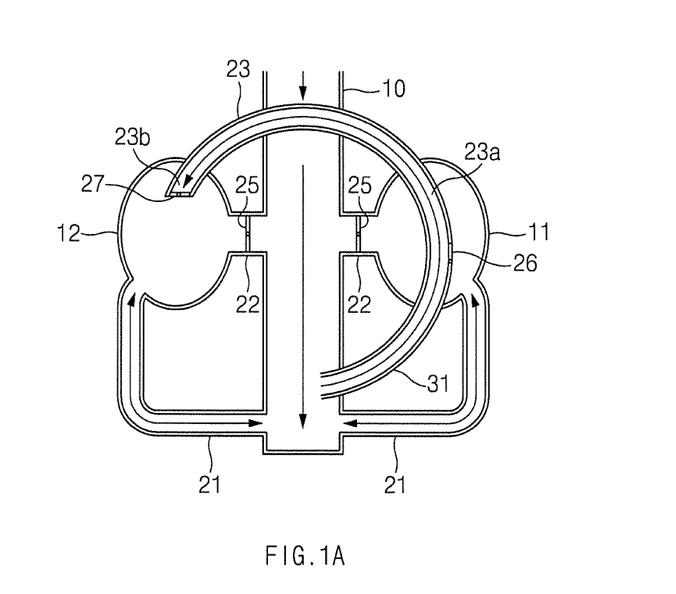
FIG. 1A and FIG. 1B are views schematically illustrating a configuration of a variable intake system according to an exemplary embodiment of the present disclosure.
Figure 1B:
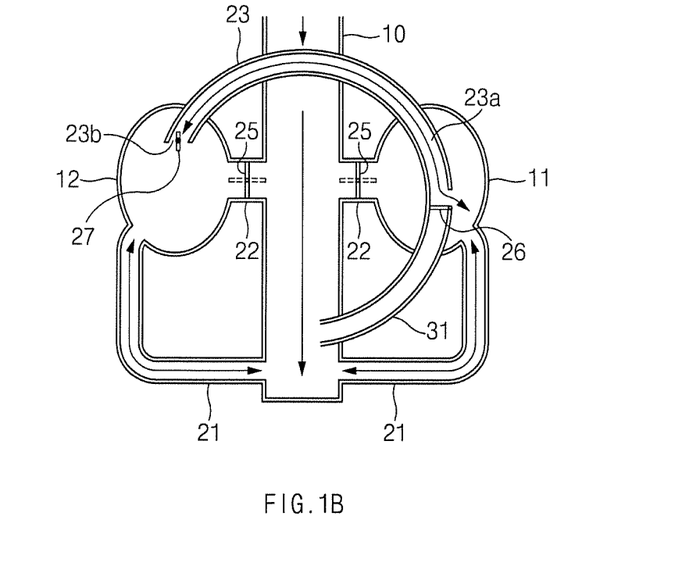

FIG. 1A and FIG. 1B are views schematically illustrating a configuration of a variable intake system according to an exemplary embodiment of the present disclosure.

Referring to FIG. 1A and FIG. 1B, the variable intake system according to an exemplary embodiment of the present disclosure may include a main intake pipe 10 and a pair of surge tanks 11 and 12 connected to the main intake pipe 10.

The main intake pipe 10 has a flow channel intaking ambient air and inducing the intaken air to an engine, and a throttle valve (not shown) adjusting an amount of intaken air introduced to the engine is installed at the flow channel of the main intake pipe 10.

The surge tanks 11 and 12 are each adjacent to the main intake pipe 10 and connected to the main intake pipe 10 through low speed communication pipes 21 and high speed communication pipes 22. The pair of surge tanks 11 and 12 may include a first surge tank 11 and a second surge tank 12 bilaterally symmetrically connected to the main intake pipe 10.

One set of ends of the low speed communication pipes 21 are connected to sides of the main intake pipe 10 and the other ends thereof are connected to the surge tanks 11 and 12, whereby the low speed communication pipes 21 connect the main intake pipe 10 and the pair of surge tanks 11 and 12.

One set of ends of the high speed communication pipes 22 are connected to the other sides of the main intake pipe 10 and the other ends thereof are connected to the surge tanks 11 and 12, whereby the high speed communication pipes 22 connect the main intake pipe 10 and the pair of surge tanks 11 and 12.

The low speed communication pipes 21 are formed to be longer than the high speed communication pipes 22. High speed valves 25 are installed to be opened and closed at flow channels of the high speed communication pipes 22, and separate valves are not installed at the low speed communication pipes 21, and thus, the surge tanks 11 and 12 and the main intake pipe 10 may communicate with each other through the low speed communication pipes 21 all the time.

A middle speed communication pipe 23 is connected between the first surge tank 11 and the second surge tank 12. The middle speed communication pipe 23 is shorter than the low speed communication pipes 21 and longer than the high speed communication pipes 22, and an inner diameter of the middle speed communication pipe 23 is smaller than those of the high speed communication pipes 22. Middle speed valves 26 and 27 are installed to be opened and closed at a flow channel of the middle speed communication pipe 23.

In particular, the middle speed communication pipe 23 has a first end portion 23a connected to the first surge tank 11 and a second end portion 23b connected to the second surge tank 12.

An intake operation according to such a configuration will be described in detail.

As illustrated in FIG. 1A, when the high speed valves 22 and the middle speed valves 26 and 27 are closed, intaken air may flow between the first and second surge tanks 11 and 12 and the main intake pipe 10, whereby low speed operation performance of the engine may be implemented.

As illustrated in FIG. 1B, when the middle speed valves 26 and 27 are opened in a state in which the high speed valves 25 are closed, intaken air may flow between the first and second surge tanks 11 and 12 through the middle speed communication pipe 23, whereby middle speed operation performance of the engine may be implemented.

As illustrated in FIG. 1B, when the high speed valves 25 are opened (please refer to the hidden line of FIG. 1B) in a state in which the middle speed valves 26 and 27 are opened, intaken air may flow between the first and second surge tanks 11 and 12 and the main intake pipe 10 through the high speed communication pipes 22 and the middle speed communication pipe 23, whereby high speed operation performance of the engine may be implemented.

Also, the variable intake system according to an exemplary embodiment of the present disclosure includes a noise reducing member able to effectively reduce noise including low frequency noise.

In particular, the noise reducing member of the present disclosure is based on the recognition that the middle speed communication pipe 23 is not in use when the engine is operated at a low speed. One end of the middle speed communication pipe 23 is configured to directly communicate with the main intake pipe 10 through an extending pipe 31, and when the engine is operated at a low speed, one end of the middle speed communication pipe 23 and the main intake pipe 10 are allowed to communicate with each other, while the other end of the middle speed communication pipe 23 is closed, whereby a quarter wave resonator may be implemented at one end of the middle speed communication pipe 23, and thus, noise including low frequency noise may be effectively reduced when the engine is operated at a low speed.

Figure 2:
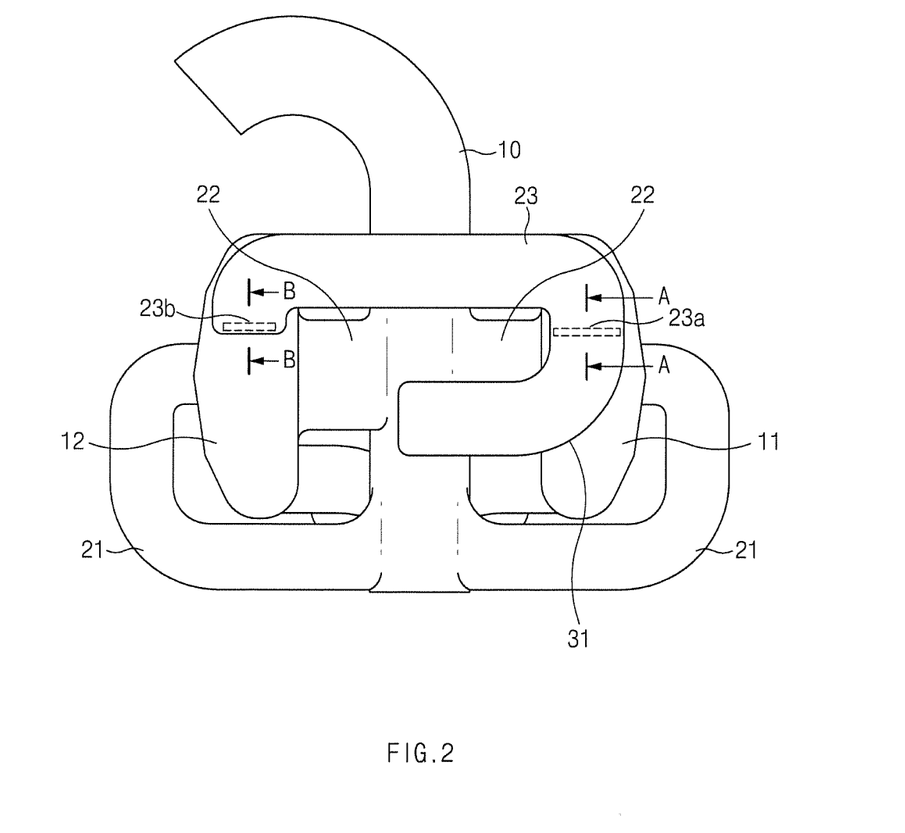
FIG. 2 is a view illustrating a variable intake system according to an exemplary embodiment of the present disclosure.

In detail, as illustrated in FIGS. 1A, 1B and 2, one end of the extending pipe 31 is connected to one end of the middle speed communication pipe 23, and the other end of the extending pipe 31 is connected to communicate with the main intake pipe 10. The middle speed communication pipe 23 is configured to selectively communicate with any one of the extending pipe 31 and the main intake pipe 10, whereby low frequency noise, or the like, may be effectively reduced when the engine is operated at a low speed.

The middle speed communication pipe 23 has a first end portion 23a connected to the first surge tank 11 and a second end portion 23b connected to the second surge tank 12. The extending pipe 31 is configured to be connected to at least one of the first end portion 23a and the second end portion 23b of the middle speed communication pipe 23 so as to be connected to the main intake pipe 10.

In FIGS. 1A, 1B and 2, it is illustrated that the extending pipe 31 is connected to the first end portion 23a of the middle speed communication pipe 23, but the extending pipe 31 may be connected to the second end portion 23b or may be connected to both of the first and second end portions 23a and 23b.

Figure 3:
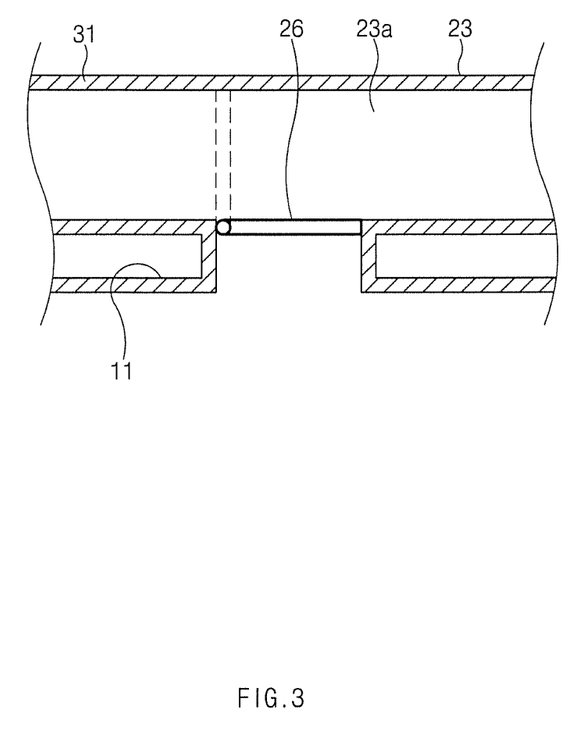
FIG. 3 is a cross-sectional view taken along line A-A of FIG. 2.

Referring to FIGS. 1A, 1B and 2, one end of the extending pipe 31 is connected to the first end portion 23a of the middle speed communication pipe 23 and the other end thereof is connected to the main intake pipe 10. The first middle speed valve 26 is installed at the first end portion 23a of the middle speed communication pipe 23 as illustrated in FIG. 3, and the middle speed communication pipe 23 may selectively communicate with any one of the extending pipe 31 and the first surge tank 11 according to a switching operation of the first middle speed valve 26. That is, the first middle speed valve 26 is a selective communication member allowing the middle speed communication pipe 23 to selectively communicate with the extending pipe 31 or the first surge tank 11. By allowing the middle speed communication pipe 23 to communicate with the extending pipe 31 when the engine is operated at a low speed, the middle speed communication pipe 23 may be implemented to have a quarter wave resonator structure for reducing noise.

Figure 5:
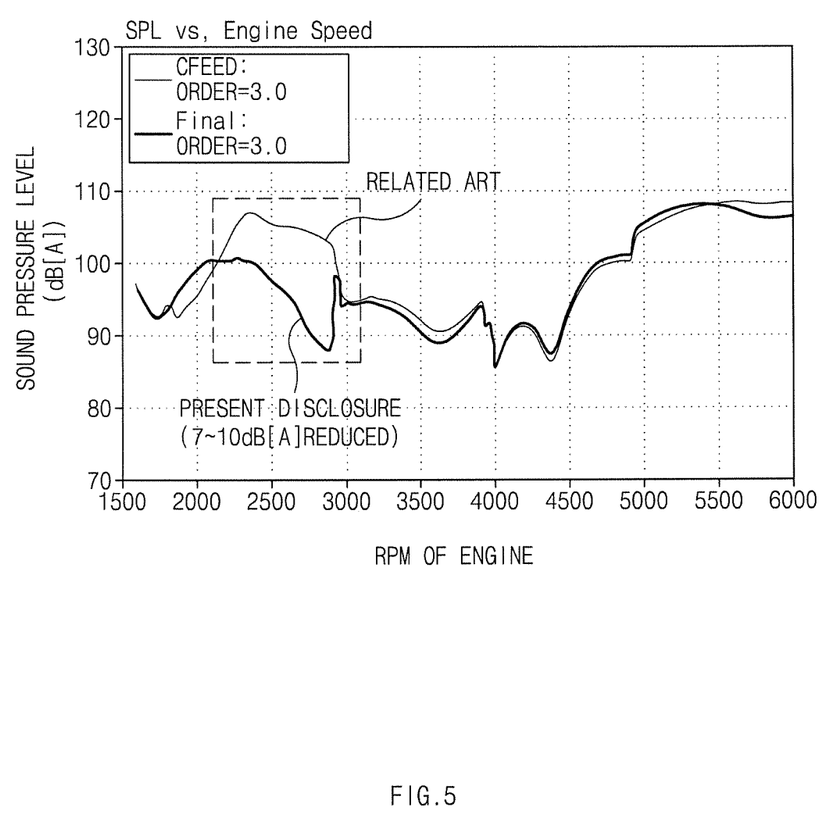
FIG. 5 is a graph illustrating a comparison between sound pressure levels of the related art and the present disclosure of RPM levels of the engine.

In particular, as illustrated in FIGS. 2 and 5, since the first middle speed valve 26 is installed at one end of the extending pipe 31, that is, at a portion where the first end portion 23a of the middle speed communication pipe 23 and the first surge tank 11 are connected to each other, the first end portion 23a of the middle speed communication pipe 23 may selectively communicate with the extending pipe 31 or the first surge tank 11 according to a switching operation of the first middle speed valve 26.

Figure 4:
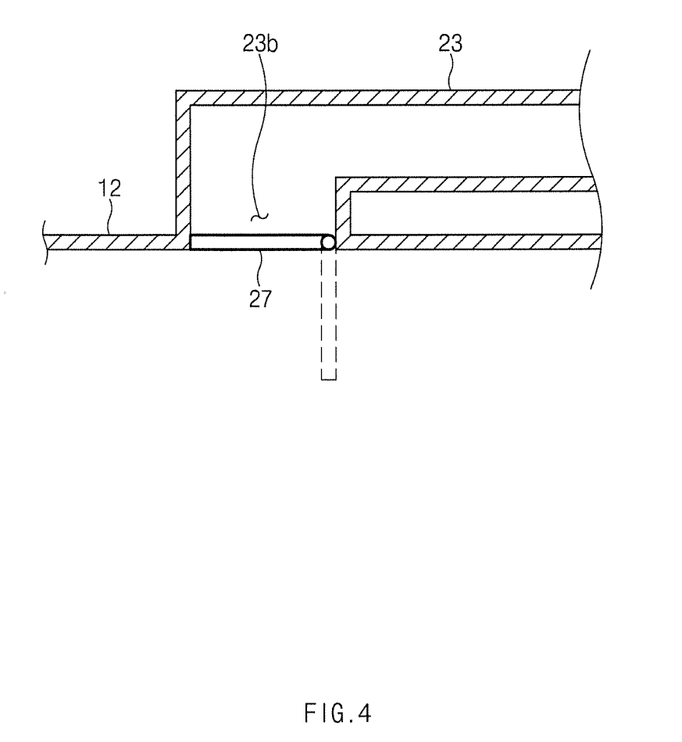
FIG. 4 is a cross-sectional view taken along line B-B of FIG. 2.

As illustrated in FIGS. 2 and 4, a second middle speed valve 27 is installed at the second end portion 23b of the middle speed communication pipe 23, and as the second end portion 23b of the middle speed communication pipe 23 is opened or closed according to an opening or closing operation of the second middle speed valve 27, the second end portion 23b of the middle speed communication pipe 23 may selectively communicate with the second surge tank 12.

When the engine is operated at a low speed, the second end portion 23b of the middle speed communication pipe 23 is closed according to a closing operation of the second middle speed valve 27 (please refer to the solid lines of FIGS. 1A and 4) so as to be blocked with respect to the second surge tank 12 and the middle speed communication pipe 23 communicates with the extending pipe 31 according to a first switching operation (please refer to the solid lines of FIGS. 1A and 3) of the first middle speed valve 26. In this manner, since the first end portion 23a of the middle speed communication pipe 23 communicates with the extending pipe 31 and the second end portion 23b thereof is closed, the middle speed communication pipe 23 and the extending pipe 31 may implement a structure of a quarter wave resonator. Thus, as the middle speed communication pipe 23 with the second end portion 23b closed communicates with the extending pipe 31, intaken air is introduced to the closed second end portion 23b of the middle speed communication pipe 23 through the extending pipe 31 and subsequently reflected from the closed second end portion 23b and returned back, whereby noise may be effectively reduced by a phase difference.

FIG. 5 is a graph illustrating a comparison between sound pressure levels of the related art and the present disclosure over various RPMs of the engine. As illustrated in FIG. 5, it can be seen that, in the present disclosure, since the middle speed communication pipe 23 communicates with the extending pipe 31, implementing a quarter wave resonator, the sound pressure level is significantly reduced by 7 to 10 dB in the low speed region as compared with the related art.

Also, when the engine is operated at a middle speed or high speed, the second end portion 23b of the middle speed communication pipe 23 is opened according to an opening operation of the second middle speed valve 27 (please refer to the hidden lines of FIGS. 1B and 4) to communicate with the second surge tank 12 and the first end portion 23a of the middle speed communication pipe 23 communicates with the first surge tank 11 according to a second switching operation (please refer to the hidden lines of FIGS. 1B and 3) of the first middle speed valve 26. Accordingly, intaken air may communicate with each other through the first surge tank 11 and the second surge tank 12.

As described above, according to exemplary embodiments of the present disclosure, since the noise reducing structure for reducing noise is integrally provided in the intake manifold, there is no need to install a separate resonator, such as a Helmholtz resonator or a tubular quarter wave resonator, in the middle of an air intake pipe, eliminating a restriction of an installation space and not incurring additional cost due to an installation of a resonator.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A variable intake system comprising:
a pair of surge tanks connected in a communicating manner to a main intake pipe through a low speed communication pipe and a high speed communication pipe;
a middle speed communication pipe for connecting the pair of surge tanks; and a noise reducing member integrally provided at the middle speed communication pipe to reduce noise,
wherein the noise reducing member includes an extending pipe extending from at least one end portion of the middle speed communication pipe and connected to the main intake pipe and a selective communication member configured to operate to enable the middle speed communication pipe to selectively communicate with any one of the extending pipe and the main intake pipe.

2. The variable intake system according to claim 1, wherein the noise reducing member allows one end of the middle speed communication pipe to directly communicate with the main intake pipe, and when an engine is operated at a low speed, the noise reducing member enables one end of the middle speed communication pipe to communicate with the main intake pipe and closes the other end of the middle speed communication pipe.

3. The variable intake system according to claim 1, wherein the selective communication member is a middle speed valve installed at a portion where the extending pipe, the middle speed communication pipe, and the pair of surge tanks are connected to each other, and the extending pipe selectively communicates with any one of the middle speed communication pipe and the pair of surge tanks according to a switching operation of the middle speed valve.

4. The variable intake system according to claim 3, wherein a first middle speed valve is installed at one end of the middle speed communication pipe, a second middle speed valve is installed at the other end of the middle speed communication pipe, the middle speed communication pipe selectively communicates with any one of the extending pipe and the pair of surge tanks according to the switching operation of the first middle speed valve, and the other end of the middle speed communication pipe is opened and closed according to an opening and closing operation of the second middle speed valve.

5. The variable intake system according to claim 4, wherein when an engine is operated at a low speed, the other end of the middle speed communication pipe is closed according to the closing operation of the second middle speed valve, and the middle speed communication pipe communicates with the extending pipe according to a first switching operation of the first middle speed valve.

6. The variable intake system according to claim 4, wherein when an engine is operated at a middle or high speed, the other end of the middle speed communication pipe is opened according to the opening operation of the second middle speed valve, and the middle speed communication pipe communicates with the pair of surge tanks according to a second switching operation of the first middle speed valve.

7. A variable intake system comprising:
a main intake pipe to intake air;
first and second surge tanks connected to the main intake pipe in a communicating manner;
a high speed communication pipe for connecting the first and second surge tanks and the main intake pipe and having a high speed valve installed to be opened and closed;
a low speed communication pipe connecting the first and second surge tanks and the main intake pipe and formed to be longer than the high speed communication pipe;
a middle speed communication pipe having a first end portion connected to the first surge tank and a second end portion connected to the second surge tank and having at least one middle speed valve installed to be opened and closed; and
an extending pipe extending from the first end portion of the middle speed communication pipe and connected to the main intake pipe,
wherein the first surge tank and one end of the extending pipe are connected in a communicating manner to the first end portion of the middle speed communication pipe, a first middle speed valve is installed at the first end portion of the middle speed communication pipe, and the first end portion of the middle speed communication pipe selectively communicates with the extending pipe or the first surge tank according to a switching operation of the first middle speed valve.

8. The variable intake system according to claim 7, wherein the second surge tank is connected in a communicating manner to the second end portion of the middle speed communication pipe, a second middle speed valve is installed at the second end portion of the middle speed communication pipe, and the second end portion of the middle speed communication pipe is opened and closed according to an opening or closing operation of the second middle speed valve.

9. The variable intake system according to claim 8, wherein when an engine is operated at a low speed, the second end portion of the middle speed communication pipe is closed according to the closing operation of the second middle speed valve so as to be blocked with respect to the second surge tank and the middle speed communication pipe communicates with the extending pipe according to a first switching operation of the first middle speed valve.

10. The variable intake system according to claim 9, wherein when the engine is operated at a middle or high speed, the second end portion of the middle speed communication pipe is opened according to the opening operation of the second middle speed valve so as to communicate with the second surge tank, and the first end portion of the middle speed communication pipe communicates with the first surge tank according to a second switching operation of the first middle speed valve.

* * * * *